(12) United States Patent
Jeong et al.

(10) Patent No.: US 8,871,898 B2
(45) Date of Patent: *Oct. 28, 2014

(54) METHOD FOR PREPARING CARBON DIOXIDE/EPOXIDE COPOLYMERS CONTAINING ETHER LINKAGES

(75) Inventors: JiSu Jeong, Daejeon (KR); SungJae Na, Daejeon (KR); Sujith Sudevan, Daejeon (KR); MyungAhn Ok, Daejeon (KR); YongGyu Han, Daejeon (KR); KwangJin Chung, Daejeon (KR); BunYeoul Lee, Suwon-si (KR); Kodiyan Varghese Jobi, Suwon-si (KR)

(73) Assignees: SK Innovation Co., Ltd., Seoul (KR); SK Global Chemical Co., Ltd., Seoul (KR)

( * ) Notice: Subject to any disclaimer, the term of this patent is extended or adjusted under 35 U.S.C. 154(b) by 263 days.

This patent is subject to a terminal disclaimer.

(21) Appl. No.: 13/406,065

(22) Filed: Feb. 27, 2012

(65) Prior Publication Data

US 2012/0232245 A1    Sep. 13, 2012

(30) Foreign Application Priority Data

Mar. 8, 2011    (KR) ........................ 10-2011-0020143

(51) Int. Cl.
| | |
|---|---|
| C08G 59/68 | (2006.01) |
| C08G 65/10 | (2006.01) |
| C08G 64/34 | (2006.01) |
| C08G 65/26 | (2006.01) |
| C08G 59/00 | (2006.01) |
| C08G 65/04 | (2006.01) |

(52) U.S. Cl.
CPC ............ *C08G 64/34* (2013.01); *C08G 65/2603* (2013.01); *C08G 65/2663* (2013.01)
USPC ........... 528/412; 528/405; 528/410; 528/421; 528/502 R

(58) Field of Classification Search
CPC .................................................... C08G 64/0208
USPC ...................... 528/405, 410, 412, 421, 502 R
See application file for complete search history.

(56) References Cited

U.S. PATENT DOCUMENTS

| | | |
|---|---|---|
| 3,278,459 A | 10/1966 | Herold |
| 5,158,922 A | 10/1992 | Hinney et al. |
| 5,482,908 A | 1/1996 | Le-Khac |

(Continued)

FOREIGN PATENT DOCUMENTS

| | | |
|---|---|---|
| EP | 0892002 A1 | 1/1999 |
| KR | 100853358 B1 | 8/2008 |

(Continued)

OTHER PUBLICATIONS

U.S. Appl. No. 13/226,985 claims.*

(Continued)

*Primary Examiner* — Duc Truong
(74) *Attorney, Agent, or Firm* — The Webb Law Firm

(57) ABSTRACT

Provided is a method for preparing poly(alkylene carbonate) containing ether linkages, by the copolymerization of an epoxy compound and carbon dioxide, with a trivalent metal complex prepared from a salen type ligand containing a quaternary ammonium salt, and a double metal cyanide (DMC) catalyst together. The amount of ether linkages can be controlled by regulating the weight ratio of two catalysts and the carbon dioxide pressure.

8 Claims, 1 Drawing Sheet

(56) References Cited

U.S. PATENT DOCUMENTS

| | | | |
|---|---|---|---|
| 5,536,883 | A | 7/1996 | Le-Khac |
| 5,693,584 | A | 12/1997 | Le-Khac |
| 5,780,584 | A | 7/1998 | Le-Khac et al. |
| 6,133,402 | A | 10/2000 | Coates et al. |
| 6,291,388 | B1 | 9/2001 | Hofmann et al. |
| 6,482,993 | B1 | 11/2002 | Hofmann et al. |
| 6,486,361 | B1 | 11/2002 | Ehlers et al. |
| 6,608,231 | B1 | 8/2003 | Ooms et al. |
| 7,008,900 | B1 | 3/2006 | Hofmann et al. |
| 8,530,616 | B2 * | 9/2013 | Jeong et al. ............ 528/412 |
| 2003/0069389 | A1 | 4/2003 | Eleveld et al. |
| 2003/0158449 | A1 | 8/2003 | Hofmann et al. |
| 2003/0236162 | A1 | 12/2003 | Eleveld et al. |
| 2004/0116281 | A1 | 6/2004 | Le-Khac et al. |
| 2004/0220430 | A1 | 11/2004 | Eleveld et al. |
| 2005/0065383 | A1 | 3/2005 | Wehmeyer |
| 2005/0096488 | A1 | 5/2005 | Kaushiva |
| 2005/0107643 | A1 | 5/2005 | Ostrowski et al. |
| 2005/0143606 | A1 | 6/2005 | Combs |
| 2005/0159629 | A1 | 7/2005 | Combs |
| 2005/0177005 | A1 | 8/2005 | Ruppel et al. |
| 2005/0192467 | A1 | 9/2005 | Mellado et al. |
| 2008/0167502 | A1 | 7/2008 | Bohres et al. |

FOREIGN PATENT DOCUMENTS

| | | |
|---|---|---|
| KR | 1020090090154 A | 8/2009 |
| KR | 1020100013255 A | 2/2010 |
| WO | 9914258 A1 | 3/1999 |
| WO | 2008136591 A1 | 11/2008 |

OTHER PUBLICATIONS

U.S. Appl. No. 13/033,252 claims.*
U.S. Appl. No. 13/369,991 claims.*

Bok, et al., Bimetallic Fluorine-Substituted Anilido-Aldimine Zinc Complexes for CO2/(Cyclohexene Oxide) Copolymerization, Inorganic Chemistry, 2006, pp. 4228-4237, vol. 45, No. 10.

Cyriac, et al., Immortal CO2/Propylene Oxide Copolymerization: Precise Control of Molecular Weight and Architecture of Various Block Copolymers, Macromolecules, 2010, pp. 7398-7401, vol. 43.

Huang, et al., Controlled Ring-Opening Polymerization of Propylene Oxide Catalyzed by Double Metal-Cyanide Complex, Journal of Polymer Science: Part A: Polymer Chemistry, 2002, pp. 1142-1150, vol. 40.

Kim, et al., Cobalt(III) Complexes of Various Salen-Type Ligand Bearing Four Quaternary Ammonium Salts and Their Reactivity for CO2/Epoxide Copolymerization, Bull. Korean Chem. Soc., 2010, pp. 829-834, vol. 31, No. 4.

Luinstra, Poly(Propylene Carbonate), Old Copolymers of Propylene Oxide and Carbon Dioxide with New Interests: Catalysis and Material Properties, Polymer Reviews, 2008, pp. 192-219, vol. 48.

Min, et al., Efficient Synthesis of a Highly Active Catalyst for CO2/Epoxide Copolymerization, Bull. Korean Chem. Soc. 2009, pp. 745-748, vol. 30, No. 3.

Na, et al., Elucidation of the Structure of a Highly Active Catalytic System for CO2/ Epoxide Copolymerization: A salen-Cobaltate Complex of an Unusual Binding Mode, Inorganic Chemistry, 2009, pp. 10455-10465, vol. 48.

Noh, et al., Two Components in a Molecule: Highly Efficient and Thermally Robust Catalytic System for CO2/Epoxide Copolymerization, J. Am. Chem. Soc. 2007, pp. 8082-8083, vol. 129.

Sarbu, et al., Non-fluorous polymers with very high solubility in supercritical CO2 down to low pressures, Nature, May 11, 2000 pp. 165-168, vol. 405.

Sujith, et al., A Highly Active and Recyclable Catalytic System for CO2/Propylene Oxide Copolymerization, Angew. Chem. Int., Ed. 2008, pp. 7306-7309, vol. 47.

Yoo, et al., Anion variation on a cobalt(III) complex of salen-type ligand tethered by four quaternary ammonium salts for CO2/epoxide copolymerization, Dalton Transactions, 2010, pp. 2622-2630, vol. 39.

* cited by examiner

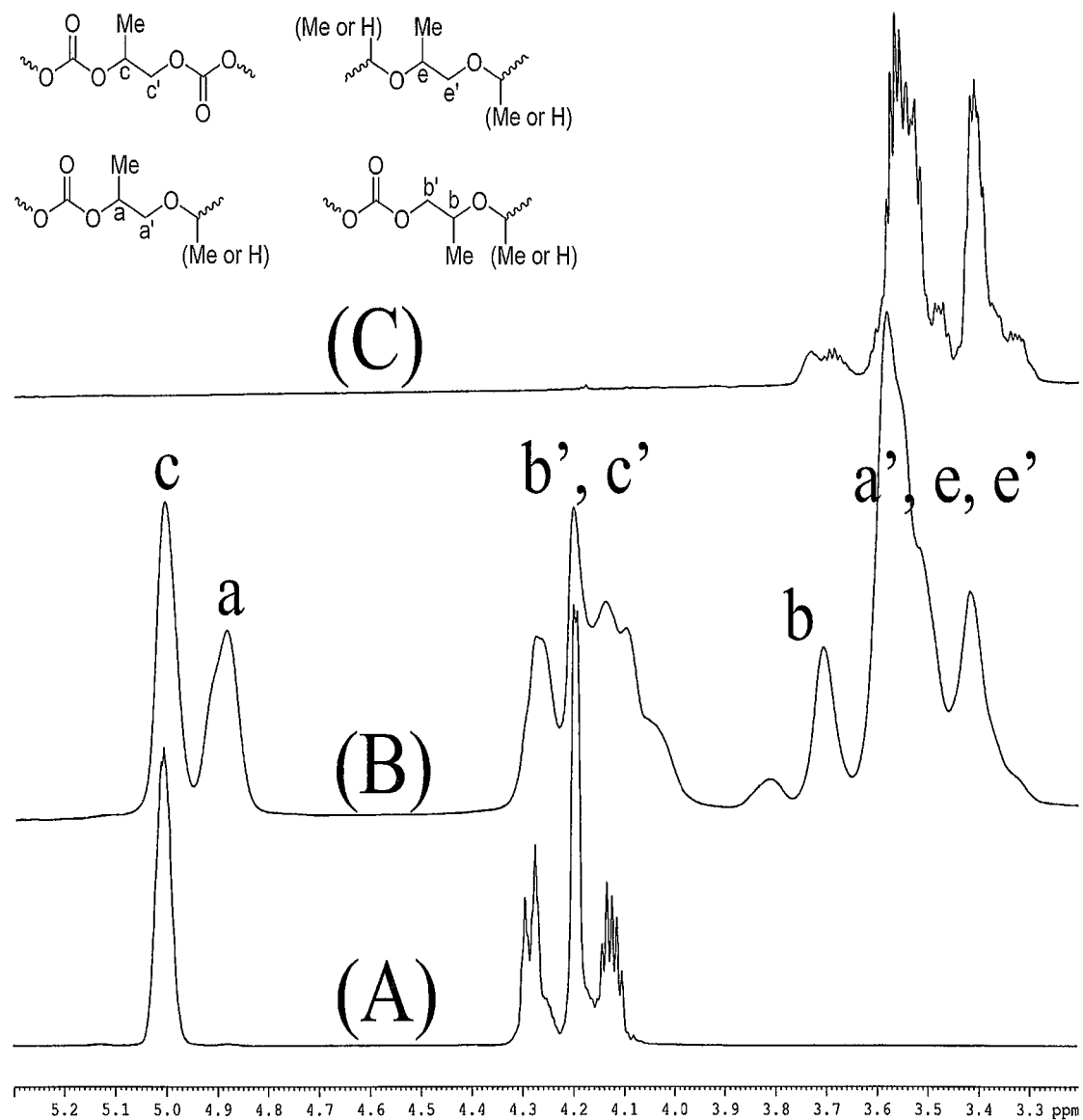

METHOD FOR PREPARING CARBON DIOXIDE/EPOXIDE COPOLYMERS CONTAINING ETHER LINKAGES

CROSS-REFERENCE TO RELATED APPLICATIONS

This application claims priority under 35 U.S.C. §119 to Korean Patent Application No. 10-2011-0020143, filed on Mar. 8, 2011, in the Korean Intellectual Property Office, the disclosure of which is incorporated herein by reference in its entirety.

TECHNICAL FIELD

The following disclosure relates to a method for preparing carbon dioxide/epoxide copolymers containing ether linkages.

BACKGROUND

Poly(alkylene carbonate) is an easily biodegradable polymer, and is useful as, for example, an adhesive agent, a packaging material, or a coating material. A method for preparing poly(alkylene carbonate) from an epoxide compound and carbon dioxide is highly eco-friendly in that phosgene, which is a poisonous compound, is not used and carbon dioxide is cheaply obtained.

Many researchers have developed various types of catalysts in order to prepare poly(alkylene carbonate) from an epoxide compound and carbon dioxide since 1960s. The present inventors recently disclosed a highly active and highly selective catalyst synthesized from quaternary ammonium salt-containing Salen [Salen; ([H$_2$Salen=N,N'-bis(3,5-dialkylsalicylidene)-1,2-ethylenediamine]-type ligand [Bun Yeoul Lee, Korean Patent Registration No. 10-0853358 (2008 Aug. 13); Bun Yeoul Lee, Sujith S, Eun Kyung Noh, Jae Ki Min, Korean Patent Registration No. 10-2008-0015454 (2008 Feb. 20); Bun Yeoul Lee, Sujith S, Eun Kyung Noh, Jae Ki Min, PCT/KR2008/002453 (2008 Apr. 30); Eun Kyung Noh, Sung Jae Na, Sujith S, Sang-Wook Kim, and Bun Yeoul Lee, *J. Am. Chem. Soc.* 2007, 129, 8082-8083 (2007 Jul. 4); Sujith S, Jae Ki Min, Jong Eon Seong, Sung Jae Na, and Bun Yeoul Lee, *Angew. Chem. Int. Ed.,* 2008, 47, 7306-7309 (2008 Sep. 8)]. The catalyst disclosed by the present inventors exhibits high activity and high selectivity, and allows the preparation of a copolymer having a large molecular weight. Also, polymerization thereof is possible even at a high temperature, and thus, the catalyst can be applied in a commercial process. In addition, since a quaternary ammonium salt is contained in the ligand, the catalyst can be easily separated from the copolymer after a copolymerization reaction of carbon dioxide/epoxide and reused.

In addition, the present inventors carefully analyzed, particularly, the structure of a catalyst exhibiting high activity and high selectivity as compared with others among a catalyst group of the patent, and then found that the catalyst has a particular structure not known in the literature, in which a nitrogen atom of the Salen-ligand is not coordinated but only oxygen atoms are coordinated to a metal (see, Structure 1 below, Sung Jae Na, Sujith S, Anish Cyriac, Bo Eun Kim, Jina Yoo, Youn K. Kang, Su Jung Han, Chongmok Lee, and Bun Yeoul Lee, "Elucidation of the Structure of A Highly Active Catalytic System for CO$_2$/Epoxide Copolymerization: A Salen-Cobaltate Complex of An Unusual Binding Mode" *Inorg. Chem.* 2009, 48, 10455-10465).

[Structure 1]

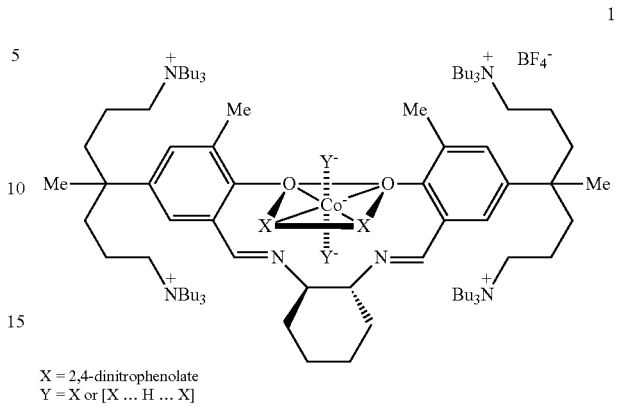

X = 2,4-dinitrophenolate
Y = X or [X ... H ... X]

In addition, there was developed a method of easily synthesizing the ligand of Structure 1 above (Min, J.; Seong, J. E.; Na, S. J.; Cyriac, A.; Lee, B. Y. *Bull. Korean Chem. Soc.* 2009, 30, 745-748).

The compound of Structure 1, which is a highly-active catalyst, is used to prepare poly(alkylene carbonate) having a high molecular weight economically. The polymer obtained in this case has a molecular structure of a complete alternating copolymer of carbon dioxide and epoxide.

The preparation of a polymer containing a predetermined amount of ether linkages of such as Molecular Structure 2 below through the carbon dioxide/epoxide copolymerization reaction is useful. The polymer chain exhibits flexibility by including ether linkages, thereby lowering the glass transition temperature of resin, and thus, the polymer can be useful for soft plastics. Further, it has been reported that poly(alkylene carbonate) containing ether linkages is soluble in supercritical carbon dioxide, and thus may be used as a surfactant in this fluid (Nature, 2000, vol 404, 165).

[Molecular Structure 2]

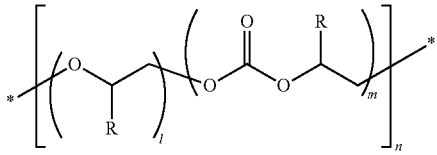

Catalysts for preparing poly(alkylene carbonate) containing ether linkages at the time of a carbon dioxide/epoxide copolymerization reaction has been reported. The present inventors have reported that poly(cyclohexene carbonate)s containing 15 to 75% of ether linkages were prepared when carbon dioxide and cyclohexene oxide were polymerized by using an anilido-aldimine zinc compound substituted with plural fluorines as a catalyst (Inorg. Chem. 2006, 45, 4228-4237). However, this has limitations that catalytic activity was low (TOF <1500 h$^{-1}$) and also the reaction proceeds only when the epoxide compound is cyclohexene oxide, and thus, industrial usefulness thereof is less. When a zinc glutarate based heterogeneous catalyst is used, there is obtained poly(alkylene carbonate) containing ether linkages of below 10% (Polymer Reviews, 2008, 48, 192).

A double metal cyanide (DMC) catalyst is most useful in preparing polyether by ring-opening polymerization of epoxide. The DMC catalyst is a term commonly used in general documents and published patents, and many patents related to methods for preparing the DMC catalyst and methods for preparing polyether using the DMC catalyst are disclosed [e.g., US Patent Publication No. 2008/0167502 (BASF); US Patent Publication No. 2003/0158449 (Bayer); US Patent Publication No. 2003/0069389 (Shell); US Patent Publication No. 2004/0220430 (Repsol Quimica); U.S. Pat. No. 5,536,883 (1996, Arco); and US Patent Publication No. 2005/0065383 (Dow)].

SUMMARY

An embodiment of the present invention is to providing a method for preparing poly(alkylene carbonate) containing ether linkages, by copolymerization using carbon dioxide and an epoxide compound as monomers, with the highly-active Salen-based catalyst and double metal cyanide (DMC) catalyst together which are previously developed for preparing poly(alkylene carbonate). The amount of ether linkages contained in the poly(alkylene carbonate) prepared through the present invention can be controlled.

In one general aspect, there is provided a method for preparing poly(alkylene carbonate) containing ether linkages, by copolymerizing an epoxide compound and carbon dioxide, with a complex of Chemical Formula 1 below and a double metal cyanide (DMC) catalyst together.

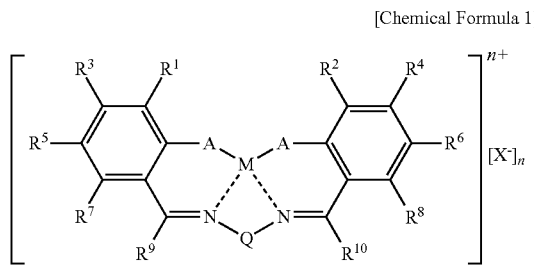

[Chemical Formula 1]

In Chemical Formula 1,
M represents trivalent cobalt or trivalent chromium;
A represents an oxygen or sulfur atom;
Q represents a diradical linking two nitrogen atoms;
$R^1$ through $R^{10}$ each independently represents hydrogen; halogen; (C1-C20)alkyl; (C1-C20)alkyl containing one or more atoms selected from halogen atom, nitrogen atom, oxygen atom, silicon atom, sulfur atom and phosphorus atom; (C2-C20)alkenyl; (C2-C20)alkenyl containing one or more atoms selected from halogen atom, nitrogen atom, oxygen atom, silicon atom, sulfur atom and phosphorus atom; (C1-C20)alkyl(C6-C20)aryl; (C1-C20)alkyl(C6-C20)aryl containing one or more atoms selected from halogen atom, nitrogen atom, oxygen atom, silicon atom, sulfur atom and phosphorus atom; (C6-C20)aryl(C1-C20)alkyl; (C6-C20)aryl(C1-C20)alkyl containing one or more atoms selected from halogen atom, nitrogen atom, oxygen atom, silicon atom, sulfur atom and phosphorus atom; (C1-C20)alkoxy; (C6-C30)aryloxy; formyl; (C1-C20)alkylcarbonyl; (C6-C20)arylcarbonyl; or a metalloid radical of group 14 metal substituted with (C1-C20)alkyl or (C6-C20)aryl;
two of $R^1$ through $R^{10}$ may be linked to each other to form a ring;
at least one of hydrogens included in $R^1$ through $R^{10}$ and Q is substituted with a cationic group selected from the group consisting of Chemical Formula a, Chemical Formula b, and Chemical Formula c below;

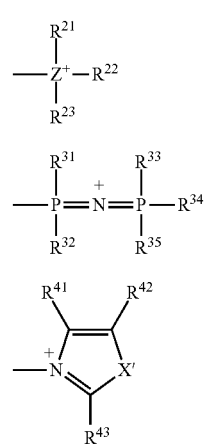

[Chemical Formula a]

[Chemical Formula b]

[Chemical Formula c]

$X^-$ each independently represents a halide anion; $HCO_3^-$; $BF_4^-$; $ClO_4^-$; $NO_3^-$; $PF_6^-$; (C6-C20)aryloxy anion; (C6-C20)aryloxy anion containing one or more atoms selected from halogen atom, nitrogen atom, oxygen atom, silicon atom, sulfur atom, and phosphorus atom; (C1-C20)alkylcarboxyl anion; (C1-C20)alkylcarboxyl anion containing one or more atoms selected from halogen atom, nitrogen atom, oxygen atom, silicon atom, sulfur atom, and phosphorus atom; (C6-C20)arylcarboxyl anion; (C6-C20)arylcarboxyl anion containing one or more atoms selected from halogen atom, nitrogen atom, oxygen atom, silicon atom, sulfur atom, and phosphorus atom; (C1-C20)alkoxy anion; (C1-C20)alkoxy anion containing one or more atoms selected from halogen atom, nitrogen atom, oxygen atom, silicon atom, sulfur atom, and phosphorus atom; (C1-C20)alkylcarbonate anion; (C1-C20)alkylcarbonate anion containing one or more atoms selected from halogen atom, nitrogen atom, oxygen atom, silicon atom, sulfur atom, and phosphorus atom; (C6-C20)arylcarbonate anion; (C6-C20)arylcarbonate anion containing one or more atoms selected from halogen atom, nitrogen atom, oxygen atom, silicon atom, sulfur atom, and phosphorus atom; (C1-C20)alkylsulfonate anion; (C1-C20)alkylsulfonate anion containing one or more atoms selected from halogen atom, nitrogen atom, oxygen atom, silicon atom, sulfur atom, and phosphorus atom; (C1-C20)alkylamido anion; (C1-C20)alkylamido anion containing one or more atoms selected from halogen atom, nitrogen atom, oxygen atom, silicon atom, sulfur atom, and phosphorus atom; (C6-C20)arylamido anion; (C6-C20)arylamido anion containing one or more atoms selected from halogen atom, nitrogen atom, oxygen atom, silicon atom, sulfur atom, and phosphorus atom; (C1-C20)alkylcarbamate anion; (C1-C20)alkylcarbamate anion containing one or more atoms selected from halogen atom, nitrogen atom, oxygen atom, silicon atom, sulfur atom, and phosphorus atom; or (C6-C20)arylcarbamate anion; (C6-C20)arylcarbamate anion containing one or more atoms selected from halogen atom, nitrogen atom, oxygen atom, silicon atom, sulfur atom, and phosphorus atom;
Z represents a nitrogen or phosphorus atom;
$R^{21}$, $R^{22}$, $R^{23}$, $R^{31}$, $R^{32}$, $R^{33}$, $R^{34}$ and $R^{35}$ each independently represents (C1-C20)alkyl; (C1-C20)alkyl containing one or more atoms selected from halogen atom, nitrogen atom, oxygen atom, silicon atom, sulfur atom and phosphorus atom; (C2-C20)alkenyl; (C2-C20)alkenyl containing one or more atoms selected from halogen atom, nitrogen atom, oxygen atom, silicon atom, sulfur atom and phosphorus atom; (C1-C20)alkyl(C6-C20)aryl; (C1-C20)alkyl(C6-C20)aryl containing one or more atoms selected from halogen atom, nitrogen atom, oxygen atom, silicon atom, sulfur atom and phosphorus atom; (C6-C20)aryl(C1-C20)alkyl; (C6-C20) aryl(C1-C20)alkyl containing one or more atoms selected from halogen atom, nitrogen atom, oxygen atom, silicon atom, sulfur atom and phosphorus atom; or a metalloid radical of group 14 metal substituted with (C1-C20)alkyl or (C6-C20)aryl; and two of $R^{21}$, $R^{22}$ and $R^{23}$, or two of $R^{31}$, $R^{32}$, $R^{33}$, $R^{34}$ and $R^{35}$ may be linked to each other to form a ring;

$R^{41}$, $R^{42}$ and $R^{43}$ each independently represents hydrogen; (C1-C20)alkyl; (C1-C20)alkyl containing one or more atoms selected from halogen atom, nitrogen atom, oxygen atom, silicon atom, sulfur atom and phosphorus atom; (C2-C20) alkenyl; (C2-C20)alkenyl containing one or more atoms selected from halogen atom, nitrogen atom, oxygen atom, silicon atom, sulfur atom and phosphorus atom; (C1-C20) alkyl(C6-C20)aryl; (C1-C20)alkyl(C6-C20)aryl containing one or more atoms selected from halogen atom, nitrogen atom, oxygen atom, silicon atom, sulfur atom and phosphorus atom; (C6-C20)aryl(C1-C20)alkyl; (C6-C20)aryl(C1-C20) alkyl containing one or more atoms selected from halogen atom, nitrogen atom, oxygen atom, silicon atom, sulfur atom and phosphorus atom; or a metalloid radical of group 14 metal substituted with (C1-C20)alkyl or (C6-C20)aryl; and two of $R^{41}$, $R^{42}$ and $R^{43}$ may be linked to each other to form a ring;

X' represents an oxygen atom, a sulfur atom, or N—R (here, R represents (C1-C20)alkyl);

n represents an integer obtained by adding 1 to the total number of cationic groups contained in $R^1$ to $R^{10}$ and $X^-$ may be coordinated to M; and a nitrogen atom of imine may be coordinated to M or may be decoordinated from M.

The alternating copolymerization of carbon dioxide/epoxide using the compound of Chemical Formula 1 as a catalyst was patent-registered by the present inventors, and published on the journals (Korean Patent Registration No. 10-0853358; *J. Am. Chem. Soc.* 2007, 129, 8082-8083; *Angew. Chem. Int. Ed.*, 2008, 47, 7306-7309).

The double metal cyanide (DMC) catalyst is widely used as a ring-opening polymerization catalyst, and is a complicated compound constituted of two metals, cyanide ligand, and a complexing agent, such as ether, alcohol, and the like. This term is commonly used in general documents and published patents. There have been published methods for preparing DMC catalyst, according to which zinc and cobalt are mainly used as metals and various complexing agents are introduced [US Patent Publication No. 2008/0167502 (BASF); US Patent Publication No. 2003/0158449 (Bayer); US Patent Publication No. 2003/0069389 (Shell); US Patent Publication No. 2003/0236162 (Shell); US Patent Publication No. 2004/0220430 (Shell); US Patent Publication No. 2005/0107643 (BASF); U.S. Pat. No. 5,536,883 (1996, Arco); U.S. Pat. No. 6,291,388 (2001, Bayer); U.S. Pat. No. 6,486,361 (2002, Bayer); U.S. Pat. No. 6,608,231 (2003, Bayer); U.S. Pat. No. 7,008,900 (2006, Bayer); US Patent Publication No. 2005/0192467 (Repsol Quimica); US Patent Publication No. 2005/0143606 (Bayer); US Patent Publication No. 2005/0159629 (Bayer); U.S. Pat. No. 5,482,908 (1996, Arco); U.S. Pat. No. 5,780,584; U.S. Pat. No. 5,158,922 (1992, Arco); and U.S. Pat. No. 5,693,584 (1997, Arco)]. Also, there have been published patents with respect to methods for preparing polyether using DMC catalysts [US Patent Publication No. 2004/0116281 (Bayer); US Patent Publication No. 2005/0107643 (BASF); US Patent Publication No. 2004/0220430 (Repsol Quimica); U.S. Pat. No. 6,482,993 (2002, Bayer); US Patent Publication No. 2005/0177005 (BASF); US Patent Publication No. 2005/0096488 (Bayer); US Patent Publication No. 2005/0065383 (Dow); and U.S. Pat. No. 3,278,459; WO 99/14258 (Arco)].

Scheme 1 below shows a reaction mechanism expected when carbon dioxide and epoxide are copolymerized by the representative compound of Chemical Formula 1 and the DMC catalyst together. The present inventors proposed and disclosed the mechanism regarding a complete alternating copolymerization of carbon dioxide/epoxide using a cobalt complex shown in the left part of Scheme 1 (*Inorg. Chem.* 2009, 48, 10455-10465). As shown in the right part of Scheme 1, it is expected that, in the preparation of polyether using the DMC catalyst, cyanide anions nucleophilically attack epoxide to generate alkoxy anions, and in succession, these alkoxy anions nucleophilically attack epoxide, and thus, a polyether chain grows. When two catalysts are used together, the anion exchange reaction of growing chain rapidly occurs, thereby obtaining a poly(alkylene carbonate) polymer chain containing ether linkages. The amount of ether linkages contained herein may be controlled by the used ratio of two catalysts, and may be controlled by the carbon dioxide pressure.

[Scheme 1]

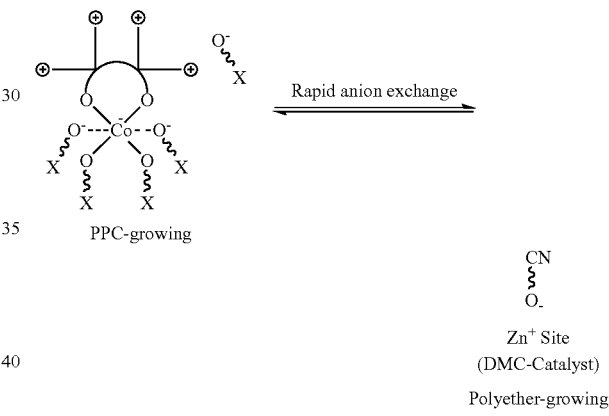

PPC-growing

Zn⁺ Site
(DMC-Catalyst)
Polyether-growing

It has not been reported a copolymerization reaction using carbon dioxide and epoxide as monomers with the complex of Chemical Formula 1 and the double metal cyanide (DMC) catalyst together.

Preferably, in Chemical Formula 1, M represents trivalent cobalt; A represents an oxygen atom; Q represents trans-1,2-cyclohexylene, phenylene, or ethylene; $R^1$ and $R^2$ represent the same or different primary (C1-C20)alkyl; $R^3$ through $R^{10}$ each independently represents hydrogen or —[$YR^{51}_{3-a}${($CR^{52}R^{53}$)$_b$N⁺$R^{54}R^{55}R^{56}$}$_a$]; Y represents C or Si; $R^{51}$, $R^{52}$, $R^{53}$, $R^{54}$, $R^{55}$ and $R^{56}$ each independently represents hydrogen; halogen; (C1-C20)alkyl; (C1-C20)alkyl containing one or more atoms selected from halogen atom, nitrogen atom, oxygen atom, silicon atom, sulfur atom and phosphorus atom; (C2-C20)alkenyl; (C2-C20)alkenyl containing one or more atoms selected from halogen atom, nitrogen atom, oxygen atom, silicon atom, sulfur atom and phosphorus atom; (C1-C20)alkyl(C6-C20)aryl; (C1-C20)alkyl(C6-C20)aryl containing one or more atoms selected from halogen atom, nitrogen atom, oxygen atom, silicon atom, sulfur atom and phosphorus atom; (C6-C20)aryl(C1-C20)alkyl; (C6-C20) aryl(C1-C20)alkyl containing one or more atoms selected from halogen atom, nitrogen atom, oxygen atom, silicon atom, sulfur atom and phosphorus atom; (C1-C20)alkoxy;

(C6-C30)aryloxy; formyl; (C1-C20)alkylcarbonyl; (C6-C20)arylcarbonyl; or a metalloid radical of group 14 metal substituted with (C1-C20)alkyl or (C6-C20)aryl, and two of $R^{54}$, $R^{55}$ and $R^{56}$ may be linked to each other to form a ring; a represents an integer of 1 to 3, b represents an integer of 1 to 20; n represents an integer of 4 or more, which is obtained by adding 1 to the total number of quaternary ammonium salts contained in $R^3$ through $R^{10}$; provided that, at least three of $R^3$ through $R^{10}$ represent $-[YR^{51}_{3-a}\{(CR^{52}R^{53})_bN^+R^{54}R^{55}R^{56}\}_a]$ when a represents 1, at least two of $R^3$ through $R^{10}$ represent $-[YR^{51}_{3-a}\{(CR^{52}R^{53})_bN^+R^{54}R^{55}R^{56}\}_a]$ when a represents 2, and at least one of $R^3$ through $R^{10}$ represents $-[YR^{51}_{3-a}\{(CR^{52}R^{53})_bN^+R^{54}R^{55}R^{56}\}_a]$ when a represents 3.

It was identified that, when each of $R^1$ and $R^2$ represents a primary alkyl and the number of quaternary ammonium salts contained in the compound is 3 or more in Chemical Formula 1, a peculiar coordination complex in which the nitrogen of an imine in Chemical Formula 1 above is not coordinated is formed in the polymerization reaction and thus particularly exhibits high activity in the copolymerization of carbon dioxide and epoxide (*Inorg. Chem.* 2009, 48, 10455-10465; *Bulletin of Korean Chemical Society* 2010, 31(4), 829-834; *Dalton Transaction*, 2010, 39(10), 2622-2630; Korean Patent Application No. 10-2008-0074435 (2008 Jul. 30)). However, the copolymerization reaction using carbon dioxide and epoxide as monomers with this type of catalyst and the double metal cyanide (DMC) catalyst together was not disclosed.

More preferably, the complex of Chemical Formula 1 above is a complex represented by Chemical Formula 2 below, and the double metal cyanide (DMC) catalyst is a complex represented by Chemical Formula 3 below.

[Chemical Formula 2]

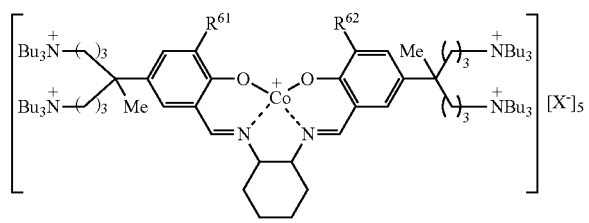

In Chemical Formula 2, $R^{61}$ and $R^{62}$ each independently represents methyl or ethyl; $X^-$ each independently represents a nitrate or acetate anion; the nitrogen of imine may be coordinated to cobalt or may be decoordinated from cobalt, and respective anions may be coordinated to cobalt.

$Zn_3[Co(CN)_6]_2 \cdot xZnCl_2 \cdot yH_2O \cdot zA$ [Chemical Formula 3]

In Chemical Formula 3, A represents a hydrocarbon including alcohol, aldehyde, ketone, ether, ester, amide, nitrile, or sulfide group; x represents a rational number of 0.001 to 3.0; y represents a rational number of 0.1 to 10; and z represents a rational number of 0.01 to 10.

The complex of Chemical Formula 2 above is a most desirable compound that can be applied in commercialization as a catalyst that can be easily synthesized in large quantities, and it was disclosed by the present inventors (*Macromolecules* 2010, 43, 7398-7401; *Bull. Korean Chem. Soc.* 2009, 30, 745-748). In addition, there is a document reporting that the double metal cyanide (DMC) catalyst is constituted of a component of Chemical Formula 3, specifically (U.S. Pat. No. 5,780,584; European Patent No. 0892002; J. Polym. Sci.: Part A: Polym. Chem. 2002, 40, 1142). It has not been reported a copolymerization reaction using carbon dioxide and epoxide as monomers with the complex of Chemical Formula 2 and the double metal cyanide (DMC) catalyst of Chemical Formula 3 together.

A complex of Chemical Formula 3 in which A represents tertiary butyl alcohol $[(CH_3)_3C(OH)]$ is commonly used as the DMC catalyst.

Also, the poly(alkylene carbonate) containing ether linkages prepared by the above method has flexibility of polymer chain imparted thereto, thereby lowering the glass transition temperature of resin to allow the usage as soft plastics, and thus, it can compensate the disadvantages of physical properties of pure poly(alkylene carbonate). In addition, the amount of ether linkages can be changed to allow various classes of resins to be prepared, resulting in variation in the usage thereof.

Meanwhile, when carbon dioxide and the epoxide compound are copolymerized in the presence of the double metal cyanide (DMC) catalyst, the carbon dioxide restrictively participates in polymerization to generate a copolymer having a low content of carbonate linkages and a high content of ether linkages. Whereas, when carbon dioxide and the epoxide compound are copolymerized by two kinds of catalysts, according to the present invention, the contents of carbonate and ether linkages within the copolymer can be variously controlled depending on purposes thereof, and the copolymer according to the present invention can have a higher content of carbonates as compared with the copolymer in the presence of the double metal cyanide (DMC) catalyst.

An example of the epoxide compound is at least one compound selected from the group consisting of (C2-C20)alkyleneoxide substituted or unsubstituted with halogen, (C1-C20)alkoxy, (C6-C20)aryloxy, or (C6-C20)ar(C1-C20)alkoxy; (C4-C20)cycloalkyleneoxide substituted or unsubstituted with halogen, (C1-C20)alkoxy, (C6-C20)aryloxy or (C6-C20)ar(C1-C20)alkoxy; and (C8-C20)styreneoxide substituted or unsubstituted with halogen, (C1-C20)alkoxy, (C6-C20)aryloxy, (C6-C20)ar(C1-C20)alkoxy, or (C1-C20)alkyl.

In the above preparing method, specific examples of the epoxide compound may include ethylene oxide, propylene oxide, butene oxide, pentene oxide, hexene oxide, octene oxide, decene oxide, dodecene oxide, tetradecene oxide, hexadecene oxide, octadecene oxide, butadiene monoxide, 1,2-epoxide-7-octene, epifluorohydrin, epichlorohydrin, epibromohydrin, isopropyl glycidyl ether, butyl glycidyl ether, t-butyl glycidyl ether, 2-ethylhexylglycidyl ether, allyl glycidyl ether, cyclopenetene oxide, cyclohexene oxide, cyclooctene oxide, cyclododecene oxide, alpha-pinene oxide, 2,3-epoxide norbornene, lemonene oxide, dieldrin, 2,3-epoxidepropylbenzene, styrene oxide, phenylpropylene oxide, stilbene oxide, chlorostilbene oxide, dichlorostilbene oxide, 1,2-epoxy-3-phenoxypropane, benzyloxymethyl oxirane, glycidyl-methylphenyl ether, chlorophenyl-2,3-epoxypropyl ether, epoxypropyl methoxyphenyl ether, biphenyl glycidyl ether, glycidyl naphthyl ether, and the like. Among them, ethylene oxide and propylene oxide are common compounds, and thus they are compounds having high industrial availability.

The epoxide compound may be used in polymerization by using an organic solvent as a reaction medium. As the organic solvent, there may be used one alone or a combination of two or more, of aliphatic hydrocarbons, such as, pentane, octane, decane, cyclohexane, and the like; aromatic hydrocarbons, such as, benzene, toluene, xylene, and the like; and halogenated hydrocarbons, such as, chloromethane, methylene chloride, chloroform, carbon tetrachloride, 1,1-dichloroethane, 1,2-dichloroethane, ethylchloride, trichloroethane, 1-chloropropane, 2-chloropropane, 1-chlorobutane, 2-chlorobutane, 1-chloro-2-methylpropane, chlorobenzene, bromobenzene, and the like. Preferably, bulk polymerization using a monomer itself as the solvent may be conducted.

A molar ratio of the epoxide compound to the complex of Chemical Formula 1 above may be 1,000 to 1,000,000:1 preferably, 50,000 to 200,000:1. A weight ratio of the complex of Chemical Formula 1 to double metal cyanide (DMC), which is used together as the catalysts, is 95:5 to 5:95, and preferably 3:7 to 7:3.

In the copolymerization reaction, the carbon dioxide pressure may range from normal pressure to 100 atm, and preferably, from 5 atm to 30 atm. In the copolymerization reaction, the polymerization temperature may range from 20° C. to 120° C., and preferably 50° C. to 90° C.

A batch type polymerization method, a semi-batch type polymerization method, or a continuous type polymerization method may be employed as the polymerization method for poly(alkylene carbonate) containing ether linkages. In a case of employing the batch type or semi-batch type polymerization method, the reaction time may be from 0.5 to 24 hours, and preferably 0.5 to 4 hours. In a case of employing the continuous type polymerization method, the retention time of catalyst may also be 0.5 to 4 hours, preferably.

The catalyst may be removed through a known method by the present inventors, who prepared poly(alkylene carbonate) containing ether linkages by using the method (Korean Patent Application No. 10-2008-0015454; Angew. Chem. Int. Ed., 2008, 47, 7306-7309).

BRIEF DESCRIPTION OF THE DRAWINGS

FIG. 1 shows $^1$H NMR spectra of (A) poly(propylene oxide), (B) poly(propylene carbonate) containing ether linkages, and (C) poly(propylene carbonate).

DETAILED DESCRIPTION OF EMBODIMENTS

Effects of the present invention will be described in detail with reference to the following examples and comparative examples. However, the following examples are only for illustrating the present invention, but do not intend to limit the scope of the present invention.

Compound 3 used as a catalyst in examples of the present invention was prepared through a known method by the present inventors (Macromolecules 2010, 43, 7398).

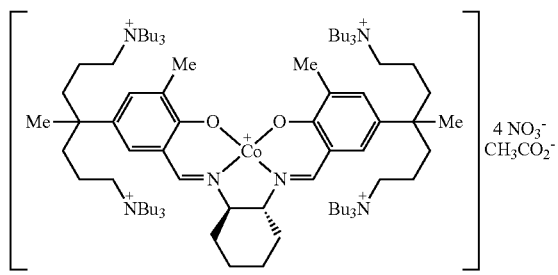

The double metal cyanide (DMC) catalyst was prepared according to the method reported in the literature (Journal of Polymer Science: Part A: Polymer Chemistry, 2002, 40, 1142.), and this will be described in detail as follows. $K_3Co(CN)_6$ (1.0 g) was dissolved in a mixture solvent of distilled water (13 g) and tertiary butyl alcohol (2 g). $ZnCl_2$ (6 g) was dissolved in a mixture solvent of distilled water (13 g) and tertiary butyl alcohol (4 g), and then this mixture solution was slowly added into the $K_3Co(CN)_6$ solution over a period of 20 minutes while being stirred therein. Further stirring for 40 minutes was performed, followed by centrifugal separation, thereby obtaining a white precipitate. The obtained precipitate was dispersed in a mixture solvent of distilled water (16 g) and tertiary butyl alcohol (16 g), followed by stirring for 20 minutes, and then a precipitate was separated by centrifugal separation. This washing procedure was repeated three times. The thus obtained precipitate was dispersed in tertiary butyl alcohol (50 g), followed by stirring for 20 minutes. Centrifugal separation was performed to obtain a precipitate. Washing using tertiary butyl alcohol was repeated once again. The solvent was removed under reduced pressure at 60° C. for 8 hours, thereby obtaining the product. The composition of the thus obtained precipitate was identical to an element analysis result, $Zn_3\text{-}[Co(CN)_6]_2\cdot nZnCl_2\cdot 0.5H_2O\cdot 2[(CH_3)_3COH]$.

EXAMPLE 1

Carbon Dioxide/Propylene Oxide Copolymerization Using Compound 3 and DMC Catalyst together Compound 3 (3.0 mg, monomer/catalyst=100,000) and propylene oxide (10.4 g, 179 mmol) were placed in a mL bomb reactor, and a double metal cyanide (DMC) catalyst was used in an amount of 4.0 mg, 5.0 mg, 6.0 mg, or 7.0 mg, as summarized in Table 1 below, and then the reactor was assembled. A carbon dioxide pressure was applied to the reactor as described in Table 1, and then the reactor was dipped in an oil bath of which the temperature is previously controlled to 73° C., followed by stirring. After 60 minutes, the internal temperature of the reactor reached 70° C., and from this time, the pressure of the reactor was observed to decrease. The polymerization reaction was conducted for 3 hour from the time at which the internal temperature of the reactor reached 70° C. and thus the reaction was initiated. The reactor was dipped in a cooling bath and cooled, and then carbon dioxide gas was removed, thereby terminating the reaction. A light yellow viscous solution was obtained. 10 g of propylene oxide was further added into the thus obtained viscous solution, thereby lowering viscosity of the solution. Then the resulting solution was passed through silica gel (400 mg, manufactured by Merck, 0.040~0.063 mm particle size (230~400 mesh)) pad, thereby obtaining a colorless solution. Monomers were removed using vacuum decomposition.

$^1$H NMR analysis confirmed generation of a propylene carbonate by-product. The amounts of generated propylene carbonate by-products were summarized by using selectivity in Table 1. Here, selectivity was defined by the amount of propylene oxide used in preparing the polymer based on the total amount of converted propylene oxide, and may be calculated by the integrated value in $^1$H NMR thereof. The generated propylene carbonate by-product was removed by storing the sample in a vacuum oven at 150° C. overnight. The copolymerization results are given in Table 1 below.
<Structure of Propylene Carbonate By-Product>

FIG. 1 shows $^1$H NMR spectra of (A) poly(propylene carbonate) not containing ether linkages, (B) poly(propylene carbonate) containing ether linkages prepared through the present invention (Entry No. 3), and (C) poly(propylene oxide) not containing a carbonate linkage prepared by using only the DMC catalyst (Entry No. 6). In Spectrum B, a new signal is observed around 4.9 ppm. This is a decisive evidence showing that the ether linkage and the carbonate linkage co-exist in the polymer chain unless the prepared polymer is not a simple mixture of poly(propylene carbonate) and poly (propylene oxide). In Table 1, the amount of ether linkages was defined and calculated by [an integral value of 3.1-3.9 ppm]/[an integral value of 3.2-5.1 ppm]

As shown in Table 1, it can be seen that the content of ether linkages can be controlled by regulating the amount of used DMC catalyst and the carbon dioxide pressure. The content of ether linkages became increased with the increase in amount of DMC catalyst (Entry No. 2 and Entry No. 4), and the content of carbonate linkage became increased with the increase in carbon dioxide pressure (Entry Nos. 1 to 3).

In the case of polymerization of propylene oxide by using only the DMC catalyst without carbon dioxide (Entry No. 6), only poly(epoxide) having an ether linkage content of 100% was obtained. Also, when propylene oxide was polymerized by using only the DMC catalyst under the carbon dioxide pressure (Entry No. 5), the ether linkage content was very high, 89%, but the carbonate content was very low, 11% since the incorporation of carbon dioxide is restricted in the polymerization. Therefore, it is considered that the copolymer of Entry No. 5 is little different from the copolymer of Entry No. 6 in view of difference in physical property of copolymer.

Therefore, the present invention suggests the preparation of poly(propylene carbonate) in which a significant amount of ether linkages is contained by allowing two catalysts to act as catalysts simultaneously and the amount thereof is controllable.

TABLE 1

Results of Carbon Dioxide/Propylene Oxide Copolymerization Using Compound 3 and DMC Catalyst together

| entry | Compound 3/DMC (mg/mg) | $CO_2$ (bar) Before Polymerization[a] | $CO_2$ (bar) After Polymerization | Yield (g) | Carbonate fraction[b] | Selectivity (%)[c] | $M_n$[d] | $M_w/M_n$ |
|---|---|---|---|---|---|---|---|---|
| 1 | 3/5 | 16 | 12 | 4.8 | 0.61 | 97 | 20000 | 6.2 |
| 2 | 3/5 | 23 | 20 | 5.2 | 0.64 | 99 | 63000 | 3.8 |
| 3 | 3/5 | 28 | 24 | 6.0 | 0.67 | 93 | 48000 | 4.7 |
| 4 | 3/6 | 23 | 18 | 6.0 | 0.42 | 96 | 10000 | 6.9 |
| 5 | 0/5 | 19 | 17 | 7.9 | 0.11 | 94 | 10000 | 1.9 |
| 6[e] | 0/5 | 0 | 0 | 10 | 0 | — | 20000 | 2.2 |

[a]Polymerization condition: PO (10 g, 170 mmol), [PO]/[3] = 100000), temperature (75° C.), time (3.0 h).
[b]Carbonate fraction determined by $^1$H NMR spectroscopy (CDCl$_3$, 400 MHz).
[c][PO incorporated into polymer]/{[propylene carbonate] + [PO incorporated into polymer]} determined by $^1$H NMR spectroscopy (CDCl$_3$, 400 MHz).
[d]Determined on GPC using a polystyrene standard.
[e]Room temperature.

As set above, poly(alkylene carbonate) containing ether linkages can be prepared, by the copolymerizaion of carbon dioxide and epoxide using the catalyst exhibiting high activity in alternating polymerization of carbon dioxide/epoxide and the double metal cyanide (DMC) catalyst used in preparing polyether through ring-opening polymerization of epoxide. The amount of ether linkages contained in poly (alkylene carbonate) can be controlled by regulating the weight ratio of the two catalysts and the carbon dioxide pressure. Since poly(alkylene carbonate) contains the ether linkages therein, it exhibits flexibility of polymer chain imparted thereto, thereby lowering the glass transition temperature of resin, and thus, the polymer can be useful for soft plastics. Further, solubility to supercritical carbon dioxide can be imparted to the carbon dioxide/epoxide copolymer.

What is claimed is:
1. A method for preparing poly(alkylene carbonate) containing ether linkages, by the copolymerization of an epoxide compound and carbon dioxide, with a complex of Chemical Compound I below and a double metal cyanide (DMC) catalyst together,

[Chemical Formula 1]

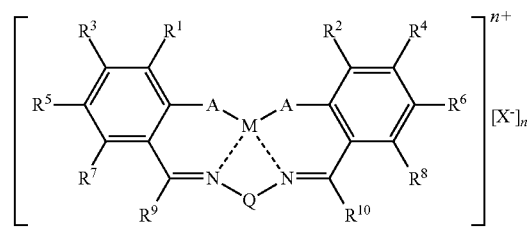

wherein, in Chemical Formula 1,
M represents trivalent cobalt or trivalent chromium;
A represents an oxygen or sulfur atom;
Q represents a diradical linking two nitrogen atoms;
$R^1$ through $R^{10}$ each independently represents hydrogen; halogen; (C1-C20)alkyl; (C1-C20)alkyl containing one or more atoms selected from halogen atom, nitrogen atom, oxygen atom, silicon atom, sulfur atom and phosphorus atom; (C2-C20)alkenyl; (C2-C20)alkenyl containing one or more atoms selected from halogen atom, nitrogen atom, oxygen atom, silicon atom, sulfur atom and phosphorus atom; (C1-C20)alkyl(C6-C20)aryl; (C1-C20)alkyl(C6-C20)aryl containing one or more atoms selected from halogen atom, nitrogen atom, oxygen atom, silicon atom, sulfur atom and phosphorus atom; (C6-C20)aryl(C1-C20)alkyl; (C6-C20)aryl(C1-C20)alkyl containing one or more atoms selected from halogen atom, nitrogen atom, oxygen atom, silicon atom, sulfur atom and phosphorus atom; (C1-C20) alkoxy; (C6-C30)aryloxy; formyl; (C1-C20)alkylcarbonyl; (C6-C20)arylcarbonyl; or a metalloid radical of group 14 metal substituted with (C1-C20)alkyl or (C6-C20)aryl;
two of $R^1$ through $R^{10}$ may be linked to each other to form a ring;

at least one of hydrogens included in $R^1$ through $R^{10}$ and Q is substituted with a cationic group selected from the group consisting of Chemical Formula a, Chemical Formula b, and Chemical Formula c below;

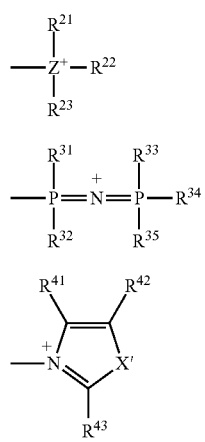

[Chemical Formula a]

[Chemical Formula b]

[Chemical Formula c]

$X^-$ each independently represents a halide anion; $HCO_3^-$; $BF_4^-$; $ClO_4^-$; $NO_3^-$; $PF_6^-$; (C6-C20)aryloxy anion; (C6-C20)aryloxy anion containing one or more atoms selected from halogen atom, nitrogen atom, oxygen atom, silicon atom, sulfur atom, and phosphorus atom; (C1-C20)alkylcarboxyl anion; (C1-C20)alkyl carboxyl anion containing one or more atoms selected from halogen atom, nitrogen atom, oxygen atom, silicon atom, sulfur atom, and phosphorus atom; (C6-C20)arylcarboxyl anion; (C6-C20)arylcarboxyl anion containing one or more atoms selected from halogen atom, nitrogen atom, oxygen atom, silicon atom, sulfur atom, and phosphorus atom; (C1-C20)alkoxy anion; (C1-C20)alkoxy anion containing one or more atoms selected from halogen atom, nitrogen atom, oxygen atom, silicon atom, sulfur atom, and phosphorus atom; (C1-C20)alkylcarbonate anion; (C1-C20)alkylcarbonate anion containing one or more atoms selected from halogen atom, nitrogen atom, oxygen atom, silicon atom, sulfur atom, and phosphorus atom; (C6-C20)arylcarbonate anion; (C6-C20)arylcarbonate anion containing one or more atoms selected from halogen atom, nitrogen atom, oxygen atom, silicon atom, sulfur atom, and phosphorus atom; (C1-C20)alkylsulfonate anion; (C1-C20)alkylsulfonate anion containing one or more atoms selected from halogen atom, nitrogen atom, oxygen atom, silicon atom, sulfur atom, and phosphorus atom; (C1-C20)alkylamido anion; (C1-C20)alkylamido anion containing one or more atoms selected from halogen atom, nitrogen atom, oxygen atom, silicon atom, sulfur atom, and phosphorus atom; (C6-C20)arylamido anion; (C6-C20)arylamido anion containing one or more atoms selected from halogen atom, nitrogen atom, oxygen atom, silicon atom, sulfur atom, and phosphorus atom; (C1-C20)alkylcarbamate anion; (C1-C20)alkylcarbamate anion containing one or more atoms selected from halogen atom, nitrogen atom, oxygen atom, silicon atom, sulfur atom, and phosphorus atom; or (C6-C20)arylcarbamate anion; (C6-C20)arylcarbamate anion containing one or more atoms selected from halogen atom, nitrogen atom, oxygen atom, silicon atom, sulfur atom, and phosphorus atom;

Z represents a nitrogen or phosphorus atom;

$R^{21}$, $R^{22}$, $R^{23}$, $R^{31}$, $R^{32}$, $R^{33}$, $R^{34}$ and $R^{35}$ each independently represents (C1-C20)alkyl; (C1-C20)alkyl containing one or more atoms selected from halogen atom, nitrogen atom, oxygen atom, silicon atom, sulfur atom and phosphorus atom; (C2-C20)alkenyl; (C2-C20)alkenyl containing one or more atoms selected from halogen atom, nitrogen atom, oxygen atom, silicon atom, sulfur atom and phosphorus atom; (C1-C20)alkyl(C6-C20)aryl; (C1-C20)alkyl(C6-C20)aryl containing one or more atoms selected from halogen atom, nitrogen atom, oxygen atom, silicon atom, sulfur atom and phosphorus atom; (C6-C20)aryl(C1-C20)alkyl; (C6-C20)aryl(C1-C20)alkyl containing one or more atoms selected from halogen atom, nitrogen atom, oxygen atom, silicon atom, sulfur atom and phosphorus atom; or a metalloid radical of group 14 metal substituted with (C1-C20)alkyl or (C6-C20)aryl; and two of $R^{21}$, $R^{22}$ and $R^{23}$, or two of $R^{31}$, $R^{32}$, $R^{33}$, $R^{34}$ and $R^{35}$ may be linked to each other to form a ring;

$R^{41}$, $R^{42}$ and $R^{43}$ each independently represents hydrogen; (C1-C20)alkyl; (C1-C20)alkyl containing one or more atoms selected from halogen atom, nitrogen atom, oxygen atom, silicon atom, sulfur atom and phosphorus atom; (C2-C20)alkenyl; (C2-C20)alkenyl containing one or more atoms selected from halogen atom, nitrogen atom, oxygen atom, silicon atom, sulfur atom and phosphorus atom; (C1-C20)alkyl(C6-C20)aryl; (C1-C20)alkyl(C6-C20)aryl containing one or more atoms selected from halogen atom, nitrogen atom, oxygen atom, silicon atom, sulfur atom and phosphorus atom; (C6-C20)aryl(C1-C20)alkyl; (C6-C20)aryl(C1-C20)alkyl containing one or more atoms selected from halogen atom, nitrogen atom, oxygen atom, silicon atom, sulfur atom and phosphorus atom; or a metalloid radical of group 14 metal substituted with (C1-C20)alkyl or (C6-C20)aryl; and two of $R^{41}$, $R^{42}$ and $R^{43}$ may be linked to each other to form a ring;

X' represents an oxygen atom, a sulfur atom, or N—R (here, R represents (C1-C20)alkyl);

n represents an integer obtained by adding 1 to the total number of cationic groups contained in $R^1$ to $R^{10}$ and Q;

$X^-$ may be coordinated to M; and a nitrogen atom of imine may be coordinated to M or may be decoordinated from M.

2. The method of claim 1, wherein the epoxide compound is at least one compound selected from the group consisting of (C2-C20)alkyleneoxide substituted or unsubstituted with halogen, (C1-C20)alkoxy, (C6-C20)aryloxy, or (C6-C20)ar (C1-C20)alkoxy; (C4-C20)cycloalkyleneoxide substituted or unsubstituted with halogen, (C1-C20)alkoxy, (C6-C20)aryloxy or (C6-C20)ar(C1-C20)alkoxy; and (C8-C20)styreneoxide substituted or unsubstituted with halogen, (C1-C20)alkoxy, (C6-C20)aryloxy, (C6-C20)ar(C1-C20)alkoxy, or (C1-C20)alkyl.

3. The method of claim 1, wherein in Chemical Formula 1, M represents trivalent cobalt; A represents an oxygen atom; Q represents trans-1,2-cyclohexylene, phenylene, or ethylene; $R^1$ and $R^2$ represent the same or different primary (C1-C20) alkyl; $R^3$ through $R^{10}$ each independently represents hydrogen or —[$YR^{51}_{3-a}${$(CR^{52}R^{53})_b N^+ R^{54} R^{55} R^{56}$}$_a$]; Y represents C or Si; $R^{51}$, $R^{52}$, $R^{53}$, $R^{54}$, $R^{55}$ and $R^{56}$ each independently represents hydrogen; halogen; (C1-C20)alkyl; (C1-C20)alkyl containing one or more atoms selected from halogen atom, nitrogen atom, oxygen atom, silicon atom, sulfur atom and phosphorus atom; (C2-C20)alkenyl; (C2-C20)alkenyl containing one or more atoms selected from halogen atom, nitrogen atom, oxygen atom, silicon atom, sulfur atom and phosphorus atom; (C1-C20)alkyl(C6-C20)aryl; (C1-C20)alkyl(C6-C20)aryl containing one or more atoms selected from halogen atom, nitrogen atom, oxygen atom, silicon atom, sulfur atom and phosphorus atom; (C6-C20)aryl(C1-C20)alkyl; (C6-C20)aryl(C1-C20)alkyl containing one or more atoms selected from halogen atom, nitrogen atom, oxygen atom, silicon atom, sulfur atom and phosphorus atom; (C1-C20)alkoxy; (C6-C30)aryloxy; formyl; (C1-C20)alkylcarbonyl; (C6-C20)arylcarbonyl; or a metalloid radical of group 14 metal substituted with (C1-C20)alkyl or (C6-C20)aryl, and two of $R^{54}$, $R^{55}$ and $R^{56}$ may be linked to each other to form a ring; a represents an integer of 1 to 3; b represents an integer of 1 to 20; n represents an integer of 4 or more, which is obtained by adding 1 to the total number of quaternary ammonium salts contained in $R^3$ through $R^{10}$; provided that, at least three of $R^3$ through $R^{10}$ represent —$[YR^{51}_{3-a}\{(CR^{52}R^{53})_b N^+ R^{54} R^{55} R^{56}\}_a]$ when a represents 1, at least two of $R^3$ through $R^{10}$ represent —$[YR^{51}_{3-a}\{(CR^{52}R^{53})_b N^+ R^{54} R^{55} R^{56}\}_a]$ when a represents 2, and at least one of $R^3$ through $R^{10}$ represents —$[YR^{51}_{3-a}\{(CR^{52}R^{53})_b N^+ R^{54} R^{55} R^{56}\}_a]$ when a represents 3.

4. The method of claim 1, wherein the compound of Chemical Formula 1 is a complex represented by Chemical Formula 2 below, the double metal cyanide (DMC) catalyst is a complex represented by Chemical Formula 3,

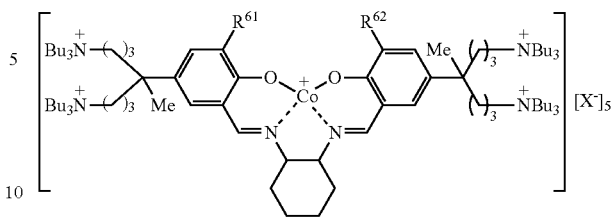

[Chemical Formula 2]

wherein, in Chemical Formula 2, $R^{61}$ and $R^{62}$ each independently represents methyl or ethyl; $X^-$ each independently represents a nitrate or acetate anion; the nitrogen of imine may be coordinated to cobalt or may be deco-ordinated from cobalt, and respective anions may be coordinated to cobalt, $Zn_3[Co(ON)_6]_2 \cdot xZnCl_2 \cdot yH_2O \cdot zA$ [Chemical Formula 3]

wherein, in Chemical Formula 3, A represents a hydrocarbon including alcohol, aldehyde, ketone, ether, ester, amide, nitrile, or sulfide group; x represents a rational number of 0.001 to 3.0; y represents a rational number of 0.1 to 10; and z represents a rational number of 0.01 to 10.

5. The method of claim 4, wherein in the complex of Chemical Formula 3, A represents tert-butyl alcohol.

6. The method of claim 4, wherein the epoxide compound is propylene oxide or ethylene oxide.

7. The method of claim 1, wherein the complex of Chemical Formula 1 and the double metal cyanide (DMC) catalyst are used at a weight ratio of 95:5 to 5:95.

8. The method of claim 7, wherein the complex of Chemical Formula 1 and the double metal cyanide (DMC) catalyst are used at a weight ratio of 3:7 to 7:3.

* * * * *